United States Patent
Williams et al.

(10) Patent No.: US 8,516,446 B2
(45) Date of Patent: Aug. 20, 2013

(54) AUTOMATED QUALIFICATION OF A BINARY APPLICATION PROGRAM

(75) Inventors: Joshua Matthew Williams, San Jose, CA (US); Luke Theodore Hiesterman, San Francisco, CA (US); Dallas De Atley, San Francisco, CA (US); Kenneth D. Anderson, Cupertino, CA (US); Andrew Dennis Boyko, Sunnyvale, CA (US); Max Muller, III, San Jose, CA (US)

(73) Assignee: Apple Inc., Cupertino, CA (US)

( * ) Notice: Subject to any disclaimer, the term of this patent is extended or adjusted under 35 U.S.C. 154(b) by 580 days.

(21) Appl. No.: 12/785,365

(22) Filed: May 21, 2010

(65) Prior Publication Data

US 2011/0289483 A1 Nov. 24, 2011

(51) Int. Cl.
*G06F 9/44* (2006.01)
*G06F 7/04* (2006.01)

(52) U.S. Cl.
USPC .............................. 717/126; 726/30; 717/124

(58) Field of Classification Search
None
See application file for complete search history.

(56) References Cited

U.S. PATENT DOCUMENTS

| | | | |
|---|---|---|---|
| 6,282,698 B1 * | 8/2001 | Baker et al. | 717/118 |
| 6,357,040 B1 * | 3/2002 | Porter | 717/154 |
| 6,986,132 B1 * | 1/2006 | Schwabe | 717/168 |
| 7,069,474 B2 | 6/2006 | Atallah et al. | |
| 7,080,356 B2 * | 7/2006 | Atallah et al. | 717/124 |
| 7,150,008 B2 | 12/2006 | Cwalina et al. | |
| 7,191,435 B2 | 3/2007 | Lau et al. | |
| 7,320,123 B2 * | 1/2008 | Govindarajapuram et al. | 717/124 |
| 7,600,219 B2 * | 10/2009 | Tsantilis | 717/122 |
| 7,814,465 B2 * | 10/2010 | Liu | 717/126 |
| 8,001,606 B1 * | 8/2011 | Spertus | 726/25 |
| 2004/0054946 A1 * | 3/2004 | Atallah et al. | 714/38 |
| 2006/0282897 A1 | 12/2006 | Sima et al. | |
| 2007/0078914 A1 | 4/2007 | Correl et al. | |
| 2007/0174817 A1 | 7/2007 | Fanning et al. | |
| 2007/0240223 A1 | 10/2007 | Zpevak et al. | |
| 2008/0134156 A1 | 6/2008 | Osminer et al. | |
| 2008/0276102 A1 | 11/2008 | MacKay et al. | |
| 2009/0083731 A1 * | 3/2009 | Sobel | 717/177 |
| 2009/0172650 A1 * | 7/2009 | Spurlin | 717/144 |
| 2010/0011209 A1 | 1/2010 | Kiriansky et al. | |
| 2010/0011415 A1 | 1/2010 | Cortes et al. | |

(Continued)

OTHER PUBLICATIONS

Anonymous, "The Solaris ABI and ABI Tools" in: Programming Interfaces Guide [online], Sun Microsystems, 2008 [retrieved Nov. 15, 2012], Retrieved from Internet: <http://pollywog.com/paul.echeverri/portfolio/netproto/p14.html>, pp. 1-9.*

(Continued)

*Primary Examiner* — Insun Kang
*Assistant Examiner* — Todd Aguilera
(74) *Attorney, Agent, or Firm* — Blakely, Sokoloff, Taylor & Zafman LLP (57) ABSTRACT

Methods and systems are disclosed that allow automated qualification of a binary application program. A binary application program submitted from a developer can be automatically examined to determine whether the binary application program complies with rules or guidelines of a platform. If the binary application program complies with the rules or guidelines, the binary application program can be qualified, and can be distributed upon further approval. If the binary application program does not comply with the rules or guidelines, the application program can be rejected and a notification can be sent to the developer.

16 Claims, 9 Drawing Sheets

(56) References Cited

U.S. PATENT DOCUMENTS

2010/0088367 A1   4/2010  Brown et al.
2010/0235823 A1*  9/2010  Garbers et al. ............... 717/170
2011/0058516 A1   3/2011  Small et al.
2011/0153559 A1*  6/2011  Rangarajan et al. .......... 707/609
2013/0055211 A1*  2/2013  Fosback et al. ............... 717/126

OTHER PUBLICATIONS

Adams, D., et al., "appcert—examine application-level products for unstable use of Solaris interfaces," Unix On-Line Man Pages [online], 2000 [retrieved Nov. 17, 2012], Retrieved from Internet: <http://www.s-gms.ms.edus.si/cgi-bin/man-cgi?appcert+1 >, pp. 1-8.*

* cited by examiner

Symbol Checking Result for Your App

Errors

Libraries
abc.lib

Functions

602

Explanation

Library abc is a library of system program interface (SPI), to which you have no access under your current license. Your submission will be rejected. Consider using another library.

604

Warnings

Classes
xyz

Selectors
+ foo
- bar

606

Class selector foo and instance selector bar are deprecated. It is possible that your submission will be rejected. Consider using another selector.

AUTOMATED QUALIFICATION OF A BINARY APPLICATION PROGRAM

TECHNICAL FIELD

This subject matter is generally related to software development.

BACKGROUND

A software development process can include a structure for creating and maintaining a software product. A software development process can include multiple stages. Some exemplary software development stages can include design, implementation, testing, and distribution. Some models of software development processes in existence today include waterfall model, spiral model, agile software development, extreme programming (XP), among others.

Modern software development processes for various data processing systems allow for participation of a vast number of diverse developers for a platform (e.g., a mobile device development platform). Tools for developing software for the platform can include a publicly available software development kit (SDK) and various rules and guidelines. The SDK can include various libraries and an integrated development environment (IDE). Using the SDK, a developer can develop an application program for the platform. The application program can be distributed to data processing systems that are compatible with the platform, for example, through an application store.

SUMMARY

Methods and systems are disclosed that allow automated qualification of a binary application program. A binary application program submitted from a developer can be automatically examined to determine whether the binary application program complies with rules or guidelines of a platform. If the binary application program complies with the rules or guidelines, the binary application program can be qualified and distributed upon further approval. If the application program does not comply with the rules and guidelines, the application program can be rejected and a notification can be sent to the developer.

In general, in one aspect, the subject matter described in this specification can be implemented by a system that includes one or more computing devices. The system can receive a binary application program from a developer. The system can scan the binary application program for symbols used in the binary application program. The symbols can be compared with reference lists that have various access permissions. The system can classify the binary application program at least in part based on result of the comparison.

These and other embodiments can optionally include one or more of the following features. The symbols can include actual or mangled names of libraries, classes, and functions including class and instance methods. A mangled name (or a decorated name) can be a name of a function, structure, class or other entity that is prefixed or suffixed with additional information (e.g., by a compiler). The known symbols can include system symbols whose access by the binary application program is prohibited, public symbols whose access by the binary application program is permitted indefinitely, and deprecated symbols whose access by the binary application program is permitted for a limited amount of time. Comparing the scanned symbols with the lists of symbols can include calculating a likelihood that the scanned symbols match one of the reference lists. Classifying the binary application program can include performing an action on the binary application program. The action can include rejecting the binary application program, conditionally approving the binary application program, and unconditionally approving the binary application program.

Particular embodiments of the subject matter described in this specification can be implemented to realize one or more of the following advantages. Using the automated qualification process, reviewing of an application program can be performed with reduced amount intervention or no intervention from a system developer, thereby speeding up the approval process. The qualification or rejection can be based on the binary form of the application program alone, without requiring an inspection of the source code of the application program. Thus, a developer need not divulge the source code. If the application program uses system libraries that are beyond the scope of a publicly available SDK, the system can reject the application program and prevent the application program from being distributed to users, thus reducing the possibility that adware or spyware is distributed to the users. The system implementing the automated qualification of application programs can detect possible use of deprecated libraries, classes, or functions, and notify the developer that the application program, although working now, may break in a future release of the platform. The developer can thus take cautionary measures (e.g., by using another functionally similar library, class, or function) to make the application program more robust.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Exemplary Software Development Process

Figure 1:
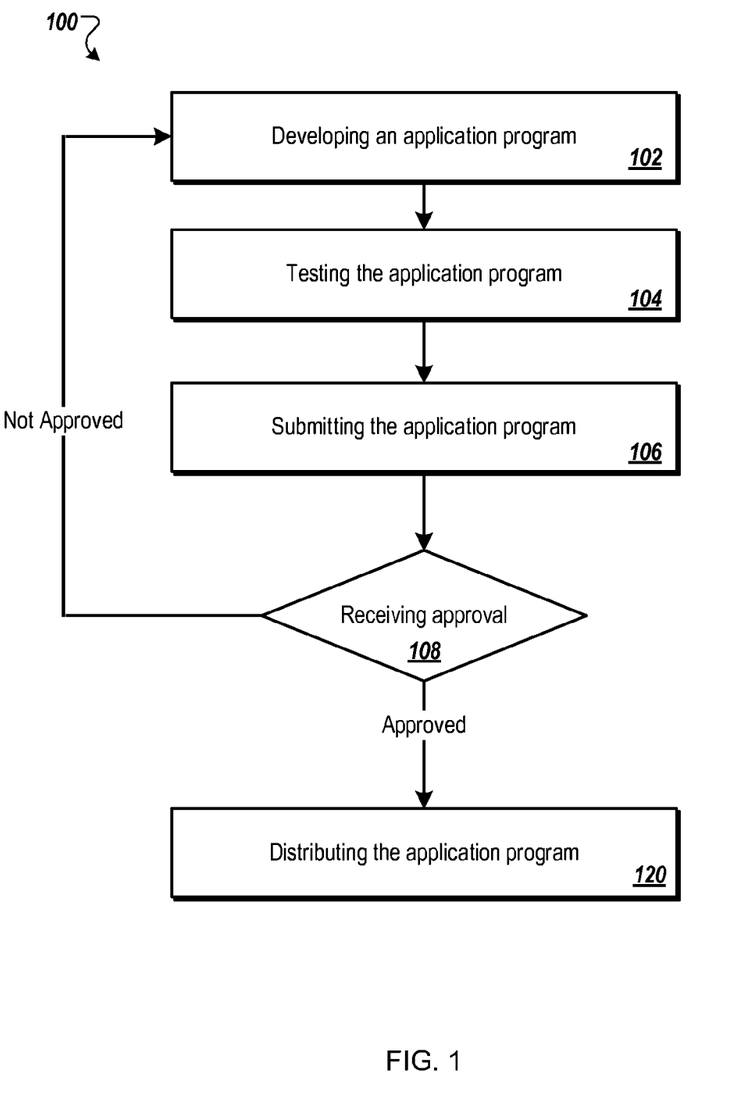
FIG. 1 is a flowchart illustrating an exemplary software qualification process.

FIG. 1 is a flowchart illustrating an exemplary software qualification process 100. In exemplary process 100, a developer acquires (e.g., by downloading) an SDK of a platform (e.g., a mobile device development platform), and develops an application program. The application program is to be distributed (e.g., provided for download) to other users of mobile devices compatible with the platform.

The developer can develop (102) an application program. In this specification, any person who engages in any part of developing the application program can be a developer. Developing the application program can include, for example, gathering requirements, designing the application program, writing source code of the application program, compiling the source code into binary code, and linking the binary code into executable code.

The application program being developed in process 100 can include any computer instructions that are configured to perform user tasks (e.g., tasks that produce results for a user) or system tasks (e.g., tasks that manage computing resources of a computer) or both. The application program can be an application program based on a specified platform (e.g., the mobile devices development platform). The platform can include published SDK and libraries. Not all libraries of the platform need to be published. For example, based on various licensing agreements, some system libraries, some classes in a particular library, or some particular functions in a class may not be available to the general public or to a particular developer, depending on a license (e.g., a public license, a preferred license, etc.) held by the developer. Thus, the developer can be prohibited from accessing certain libraries, classes, or functions, even if the libraries, classes, and functions are declared "public" (instead of "private" or "protected") in an object-oriented programming environment.

The developer can test (104) the application program, for example, by executing and debugging the executable code. Once the developer is satisfied with the testing, the developer can submit (106) the application program for review by a system or by a system developer (e.g., a developer responsible for the integrity of the platform). Submitting the application program for review can include uploading the source code, the linked binary executable code of the application program, or both, to a server for automatic or manual review. The review can include a qualification portion and optionally, and additional approval portion. During the qualification portion of the review, a system can automatically determine whether the submitted application program, sometimes in compiled and linked binary format only (e.g., without the source code), uses libraries, classes, or functions that are prohibited for use by the submitting developer. The qualification can also include automatically determining whether the application program uses deprecated libraries, classes, or functions, such that although the application program can execute properly at the time of the review, the libraries, classes, or functions are scheduled to be change or removed in the future, causing the application program to fail. The additional approval portion of the review can include, for example, determining that user interface of the application program conforms to guidelines provided with the SDK, or content provided by the application program conforms to local community standards.

The developer can receive (108) results of the qualification and approval. If the application program is not qualified or approved, a message can be sent to the developer. The message can include a statement that the application program did not pass the review process, a list of one or more errors that occurred, and an explanation for each error. The developer can redesign, reimplement, and retest the application program for submission again.

Upon qualification and approval from the review, the application program can be distributed (120). Distributing the application program can include storing the application program in a data store and providing the application program for download by other users (e.g., the general public).

Exemplary System of Automated Qualification

Figure 2:
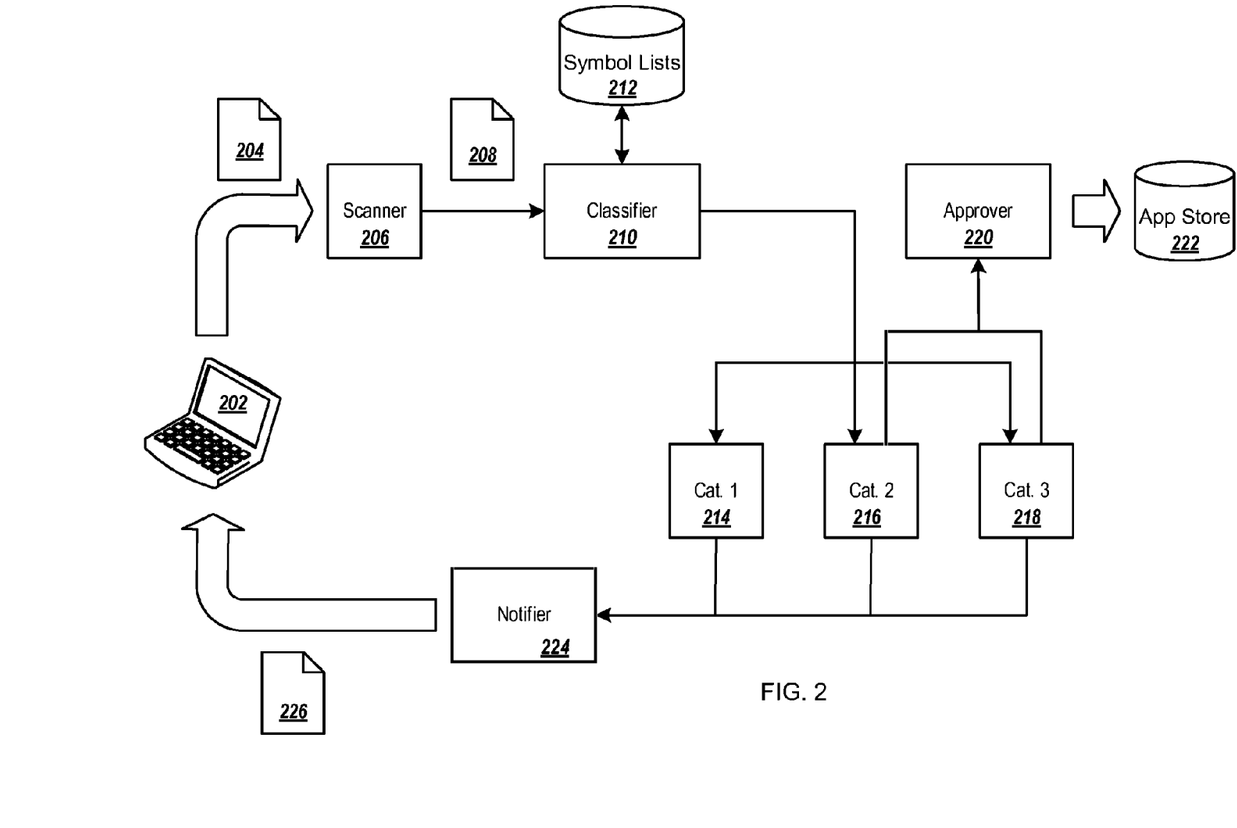
FIG. 2 illustrates components of an exemplary system implementing automated qualification of a binary application program.

FIG. 2 illustrates components of an exemplary system implementing automated qualification of a binary application program. A developer develops an application program on computing device 202. The application program can be compiled into binary application program 204. Binary application program 204 can be sent from computing device 202 to a server through a communications network. The server can include one or more hardware components (e.g., processors and storage devices) and one or more software components. The server can include subsystems that include scanner 206, classifier 210, approver 220, and notifier 224, among others. Each subsystem can include a hardware component, a software component, or both.

Scanner 206 can include a subsystem that scans binary application program 204 and generates scanned symbols 208. Scanner 206 can include various tools for analyzing binary application programs. An example scanner 206 can include an object file displaying tool (e.g., "otool" of Apple, Inc. or "nm" tool of Linux).

Scanned symbols 208 can include names and version numbers of libraries used by binary application program 204, symbols (including indirect symbols that are defined in one source file and referenced in another source file), table of contents for a dynamically linked shared library, reference table of the dynamically linked shared library, module table of the dynamically linked shared library, and other information. Scanned symbols 208 can include symbols in their original names (e.g., function "foo") or mangled names (e.g., function "_i_xyz_foo_para1_") or both. In some implementations, scanned symbols can include automatically generated identifiers of functions (e.g., selectors). Scanned symbols 208 can be in American Standard Code for Information Interchange (ASCII) format, Unicode format, or another textual or binary format (e.g., a compressed archive format).

Classifier 210 can include a subsystem that classifies (e.g., categorizes) binary application program 204 based on comparison between scanned symbols 208 and symbol lists in symbol data store 212. Symbol data store 212 can include one or more lists of symbols. Each list of symbols can include symbols with specified characteristics that can be used to classify binary application program 204. For example, a first symbol list in data store 212 can include symbols that developers using a published SDK are not permitted to access. Some examples of these symbols include names of system libraries, names of classes or methods of a system programming interface (SPI), names of classes that inherit from a system class, etc. A second symbol list in data store 212 can include names of classes that conflict with system classes, names of dangling classes or functions (e.g., classes or functions that are defined but not referenced), and names of libraries, classes, or functions that are deprecated. Libraries, classes, or functions can be deprecated if the libraries, classes, or functions, or their respective features are superseded or removed in future versions. A third list of symbols can include names of classes or functions that are subject to abuse. Names of classes or functions subject to abuse can include symbols in a published application programming interface (API) that can be used to hide a call to a unpublished API (e.g., an SPI).

Classifier 210 can compare scanned symbols 208 with the lists of symbols in data store 212. Comparing the scanned symbols 208 with the lists of symbols in data store 212 can include calculating a match score between the scanned symbols 208 with each of the lists of symbols. In some implementations, a perfect match score (e.g., 1.0) between a scanned symbol and a particular list can indicate that classifier 210 is certain that a symbol in that list is used in binary application program 204. A less than perfect match score (e.g., 0.7) can indicate that there is less than one hundred percent likelihood that a symbol in the list is used.

Based on the comparing, classifier 210 can classify binary application program 204 into one of multiple categories (e.g., category one 214, category two 216, and category three 218). Various actions can be respectively associated with the multiple categories. For example, category one 214 can be associated with an action of rejection. If binary application program 204 is classified as category one 214, binary application program 204 can be denied further approval and eventual distribution. Category one 214 binary application programs can be put in a first notification queue.

Notifier 224 can include a subsystem that can send one or more notifications 226 to developers based on the classification of the binary application program 204. For example, when binary application program 204 is rejected, notifier 224 can send notification 226 indicating that binary application program 204 is rejected and an explanation of reasons of the rejection (e.g., use of an SPI call). Rejected binary application program 204 can be removed from the first notification queue and from the system.

If binary application program 204 is classified as category two 216, binary application program 204 can be unconditionally qualified. Category two 216 binary application programs can be sent for approval by approver 220. Approver 220 can include a subsystem that approves qualified binary application program 204. Approver 220 can include one or more automated processes for determining whether binary application program 204 complies with various development guidelines that can include, for example, user interfaces specifications, user age requirement, or compliance with local or national community requirements. Once approved by approver 220, binary application program 204 can be stored in application store 222, from where users can access (e.g., purchase for download) binary application program 204. A reference (e.g., an identifier) of qualified binary application program 204 can be put in a second notification queue. Notifier 224 can notify developers of binary application programs in the second notification queue that the developers' binary application programs are qualified. In some implementations, notification 226 sent by notifier 224 can include a warning that a symbol scanned from binary application program 204 is deprecated.

If binary application program 204 is classified as category three 218, binary application program 204 can be conditionally qualified. Category three 218 binary application programs can be temporarily put on hold before they are sent for approval or distribution, pending developer response to further inquiry. Category three 218 binary application programs can be put in a third notification queue. Notifier 224 can send notification 226 to developers of binary application programs that are in the third notification queue. Notification 226 for binary application programs in the third notification queue can include the inquiry. The inquiry can seek user explanation, for example, on why a symbol scanned from binary application program 204 is sufficiently similar to an SPI call. Binary application program 204 can be sent to approver 220 if the system receives a satisfactory response from the developer. A satisfactory response can include, for example, an explanation of how the symbol is different from a system symbol even though the symbol is literally similar to the system symbol, or a change to another symbol.

Three exemplary categories 214, 216, and 218 are shown in FIG. 2. In various implementations, more or fewer categories can be used. Furthermore, the categories can be associated with actions other than rejection, conditional qualification, and warning. Other actions are possible.

Figure 3:
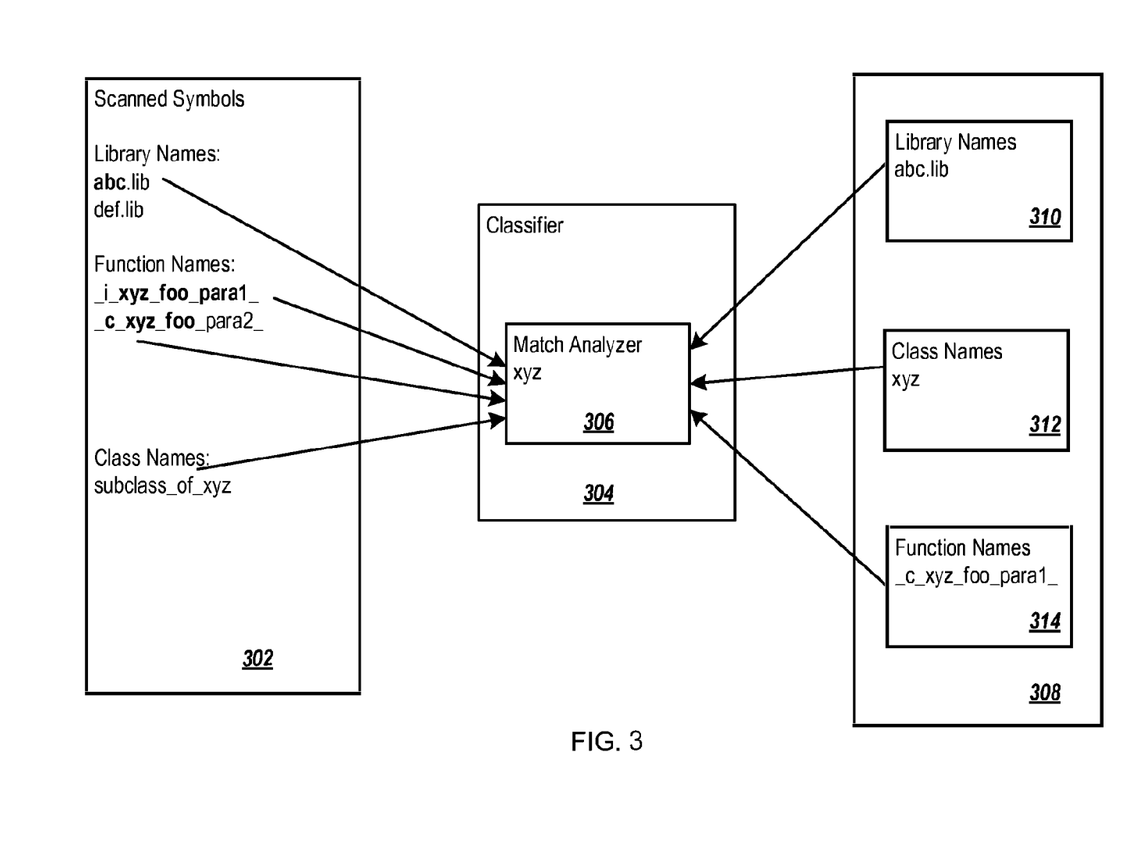
FIG. 3 illustrates an exemplary match between symbols scanned from a binary application program and a reference list.

FIG. 3 illustrates an exemplary match between symbols scanned from a binary application program and a reference list. Scanned symbols 302 can include symbols scanned from the binary application program (e.g., binary application program 204 of FIG. 2).

Scanned symbols 302 can include names of libraries linked into the binary application program. The names can include names of statically linked libraries and dynamically linked libraries. Each library can include a collection of constants, macros, routines, classes, or a combination of two or more of the above. Some libraries can include routines for accessing system functions. For example, a system library for a mobile device platform can include routines for accessing a baseband processor that manages communications functions of the mobile device. Even if every class or function in the system library is declared "public" in an object-oriented programming environment, the library may not be provided to the general public for various reasons. Some other libraries not available to the general public can include libraries under testing. The libraries under testing can be made available only to a selected group of developers (e.g., beta testers). To illustrate, a library having the name "abc.lib" as shown in FIG. 3 is a system library or a library under testing and is not to be linked into the binary application program.

Scanned symbols 302 can include class names and function names. A function can include a global function, a local function, a class method, an instance method, or any other executable routine. In some implementations, names of functions can include mangled (or decorated) names. For example, a mangled function name can include an indicator "i" or "c" that indicates whether the function is an instance method or a class method. The mangled function name can also include a name of the class (e.g., "xyz"). In some implementations, each method can correspond to a unique identifier (e.g., a selector) of the method, in addition to or in place of a mangled name. The selector can include a unique symbol (e.g., an integer) assigned to the method. Scanned symbols 302 can include text (e.g., ASCII) or binary form of the selector.

Classifier 304 can compare the scanned symbols 302 to reference list 308, which can include a list of known symbols. Reference list 308 can include library names 310, class names 312, and function names 314. Function names 314 can include global or local functions, class methods, and instance methods. In some implementations, function names 314 can include method identifiers (e.g., selectors). In some implementations, reference list 308 can be a blacklist. If a match between a scanned symbol and a symbol in the list is found, the binary application program from which the symbol is scanned can be automatically rejected.

Classifier 304 can be a classifier such as classifier 210 of FIG. 2. Classifier 304 can include match analyzer 306 that compares scanned symbols 302 with symbols in reference list 308. In some implementations, a match is found if there is an exact match. For example, classifier 304 can determine that scanned symbols 302 matches reference list 308 when a library name (e.g., "abc.lib") in scanned symbols 302 literally matches a library name in reference list 308, or when a selector in scanned symbol 302 matches a selector in function names 314 section of reference list 308.

In some implementations, match analyzer 306 can identify a match even when an exact match does not exist. Match analyzer 306 can calculate a match score between a scanned symbol and a symbol in reference list 308. The match score can indicate a similarity between portions of a first symbol (e.g., the scanned symbol) and a second symbol (e.g., the symbol in reference list 308). For example, a first symbol can have mangled name _i_xyz_foo_para1_. The mangled name can indicate that the binary application program includes an instance method (e.g., a method that is associated with an object of a class) "foo" associated with class "xyz" with parameter "para1." This function is not identical, but is similar, to a method name in reference list 308 having a mangled name _c_xyz_foo_para1_, indicating that the second symbol is a class method (or static method, a method associated with a class "xyz"), as indicated by the "c" prefix. A class method can be treated differently from an instance method, even if they have the same name. In this example, other than the class/instance distinction, the first symbol and second symbol are identical. The identical portions are indicated in bold type in scanned symbols 302. Match analyzer 306 can calculate a match score based on the difference and similarity. Likewise, a first symbol _c_xyz_foo_para2_partially match the second symbol _c_xyz_foo_para1_.

In some implementations, match analyzer 306 can identify a match based on class inheritance. Match analyzer 306 can identify classes of the scanned symbols 302 to determine whether a particular class (e.g., "subclass_of_xyz") is a subclass of a class (e.g., class "xyz") listed in list 308.

Classifier 304 can determine whether the binary application program is classified into a category based on match scores calculated by match analyzer 306 between scanned symbol 302 and each reference list 308. In some implementations, the binary application program is classified into a category (e.g., a "rejection" category) if match analyzer 306 determines that there is an exact match between a scanned symbol (e.g., "abc.lib") and a symbol (e.g., "abc.lib") in a list (e.g., a list of unpublished system symbols). In some implementations, the binary application program is classified into a category (e.g., the "rejection" category) if, although there are no exact matches, the match score of a scanned symbol satisfies a match threshold, indicating that it is highly likely that the binary application program is using an unpublished library, class, or function. In some implementations, the binary application program is classified into a category (e.g., the "rejection" category) if an aggregation of a group of scanned symbols that are similar to the known symbols results in an aggregated match score that satisfied an aggregated match threshold. Aggregating of the group of scanned symbols can include calculating the aggregated match score using a number of scanned symbols that match the known symbols in the list, and the match score of each scanned symbol.

Classifier 304 can classify the binary application program in a tiered manner. Multiple reference lists 308 can be used. Each list can correspond to a tier. For example, a tier 1 list can include unpublished symbols. A tier 2 list can include a list of symbols that are published, but, if appeared together, can indicate a likelihood of abuse based on historical data, or can be used to hide calls to unpublished SPI functions. A tier 3 list can include published but deprecated symbols. Each tier can correspond to a distance action (e.g., reject, hold, or warn). The system can start from comparing scanned symbols 301 with tier 1 lists, tier 2 lists, and so on, in the order of the tiers.

In addition to or alternative to the tiered lists, classifier 304 can use characteristics of scanned symbols 302 to classify the binary application program. For example, classifier 304 can specify that a threshold number of libraries are required of each binary application program. If a number of linked libraries in scanned symbols 302 fails to satisfy the threshold number of libraries, classifier 304 can determine that the binary application program is compiled using an unauthorized compiler or is written to purposefully circumvent unpublished libraries, classes, or functions. Accordingly, classifier 304 can classify the binary application program such that the binary application program will be rejected or put on hold.

Figure 4:
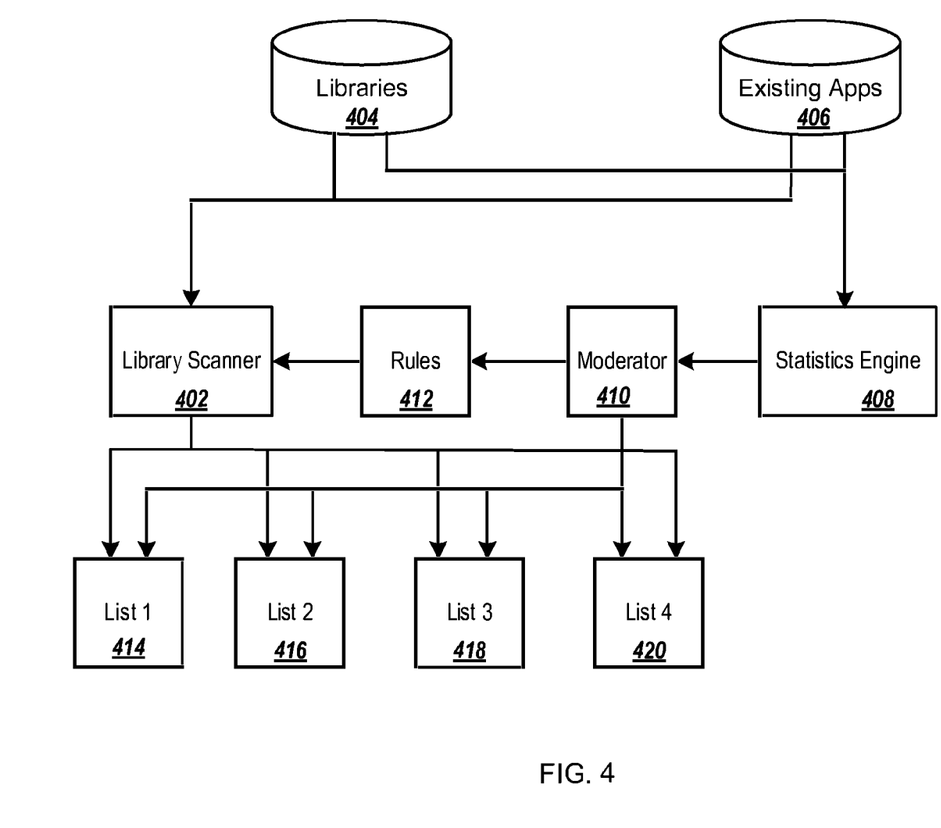
FIG. 4 is a block diagram illustrating an exemplary system that creates reference lists.

FIG. 4 is a block diagram illustrating an exemplary system that creates reference lists. The reference lists can be created from data store 404 that includes existing libraries. The existing libraries can include published libraries (e.g., the libraries that have been provided to developers in an SDK) and unpublished libraries (e.g., system libraries, experimental libraries, or proprietary libraries). Additionally or alternatively, the lists can be created from data store 406 that includes existing binary application programs that have been qualified, binary application programs that are created by system developers, or binary application programs that are created by a selected group of developers (e.g., developers who are entitled to bypass the review process).

Library scanner 402 can scan libraries in data store 404 and binary application programs in data store 406 to create reference lists 414, 416, 418, and 420 using rules 412. Rules 412 can specify access privileges of each library, class, and function. For example, rules 412 can specify which library is a published library, which library is an unpublished library, which classes in a particular library have limited access privilege, and which functions in a library or which methods in a class have limited access privilege. In some implementations, rules 412 can associate the access privileges with various licenses granted to developers. For example, a first license can specify that a developer under the first license can access a first set of libraries, classes, or functions. A second license can specify that a developer under the second license can access a second set of libraries, classes, or functions that are different from the first set. Library scanner can create a set of reference lists to be associated with each license or category of license. When a developer submits a binary application program for qualification, a current license for the user is determined (e.g., based on the user's identification as the user signed up to acquire the SDK), and a corresponding set of references lists is used to qualify the binary application program submitted by the user.

Statistics engine 408 can monitor the libraries of data store 404 and existing binary application programs of data store 406 for patterns of symbol usage. Monitoring can include analyzing the libraries and existing binary application programs to determine a frequency of use of various libraries, classes, and functions. Statistics engine 408 can submit results of the monitoring to moderator 410. Moderator 410 can determine whether a particular symbol is to be moved from a first reference list to a second reference list based on the results. For example, statistics engine 408 can determine a frequency with which a function is referenced. The statistic engine 408 can determine that the frequency satisfies a usage threshold. According to current rules 412, the function is scheduled to be removed in a future release of the SDK. Based on the usage, moderator 410 can determine that the removal of the function should be delayed to avoid concurrent invalidations of a large number of binary application programs. Moderator 410 can send a notice of the usage to a system developer and recommend that the function is to be preserved. Upon receiving a response from the system developer indicating that the function is to be preserved, moderator 410 can modify rule 412 to specify that the function is not to be deprecated. Additionally or alternatively, moderator 410 can modify one or more of reference lists 414, 416, 418, and 420, for example, to remove a symbol of the function from a deprecated function list and insert it into a permissible function list.

Likewise, moderator 410 can identify which library is used by developers the most, and recommend to the system developer that the most used library can be a first choice of improvement in a next release of the SDK. Moderator 410 can identify an unpublished library that has caused most rejections of binary application programs, and recommend converting the unpublished library or a modified version of the unpublished library into a published library.

Exemplary System of Self-Qualification

Figure 5:
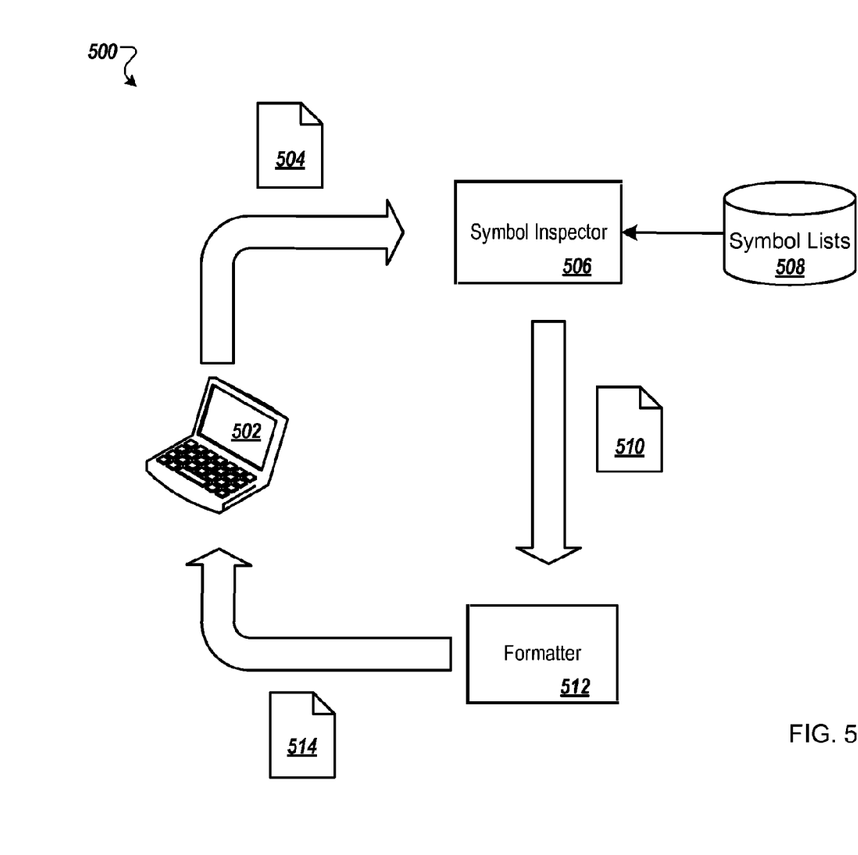
FIG. 5 illustrates components of an exemplary system where a developer can self-qualify a binary application program before submitting the application program for approval.

FIG. 5 illustrates components of exemplary system 500 where a developer can self-qualify a binary application program before submitting the application program for review. Self-qualification can be utilized to reduce time required for review by eliminating preventable rejections from the system.

A developer can create a binary application program on computing device 502 using an SDK under a license for a platform (e.g., a mobile device development platform). The developer does not knowingly use libraries, classes, or functions to which the developer has no access according to the license. However, the developer links in one or more third party libraries into the executable of the binary application program. The developer can send linked binary application program 504 to symbol inspector 506. Symbol inspector 506 can include a set of instructions executed on computing device 502, or another computing device (e.g., a server) that is connected to computing device 502 through a communications network. Symbol inspector 506 can be a stand-alone application program, a plug-in of an IDE, or a web-based service. Symbol inspector 506 can include, for example, some or all of components scanner 206, classifier 210, and notifier 224 as described above with respect to FIG. 2.

Symbol inspector 506 can be coupled to data store 508, which can store one or more reference lists against which the symbols scanned from application program 504 can be compared. The reference lists in data store 508 can be stored locally (e.g., downloaded from a server of the publisher of the SDK) or remotely (e.g., on a sever of the publisher of the SDK or on a server of a third party). The reference lists in data store 508 can be updated periodically or upon request.

Symbol inspector 506 can scan binary application program 504 for symbols and compare the scanned symbols with symbols in the reference lists stored in data store 508. Symbol inspector 506 can identify one or more suspicious symbols in the scanned symbols. Each suspicious symbol can be a symbol that matches a symbol in a reference list of symbols that the developer is not permitted to access, a reference list of symbols that are prone to be abused, or a reference list of symbols of libraries, classes, or functions to be removed in the future.

Symbol inspector 506 can compile the one or more suspicious symbols into notification 510, and send notification 510 to formatter 512. Formatter 512 can identify the suspicious symbols from notification 510, associate each suspicious symbol with a reason of suspicion, and format the symbols and the reasons into formatted notification 514. Formatted notification 514 can be sent to computing device 502 for display on a display screen. The developer can modify binary application program 504 in response, for example, by linking a different library and repeat the self-qualifying, until no more errors and warnings of binary application program 504 are present. The developer can submit the self-qualified binary application program 504 for approval.

In addition to qualifying a binary application program, system 500 can qualify other binaries. For example, symbol inspector 506 can scan and qualify object code (e.g., a compiled section of an application program) or a binary library (e.g., a downloaded third party library). In some implementations, symbol inspector 506 and reference lists in data store 508 can be modified (e.g., upgraded or downgraded) based on a license associated with an SDK. For example, if a developer acquires a new license that grants the developer more access privileges (e.g., access privileges to a system library that is previously not accessible by the developer), inspector 506 and reference lists in data store 508 can be upgraded according to the new license.

Figure 6:
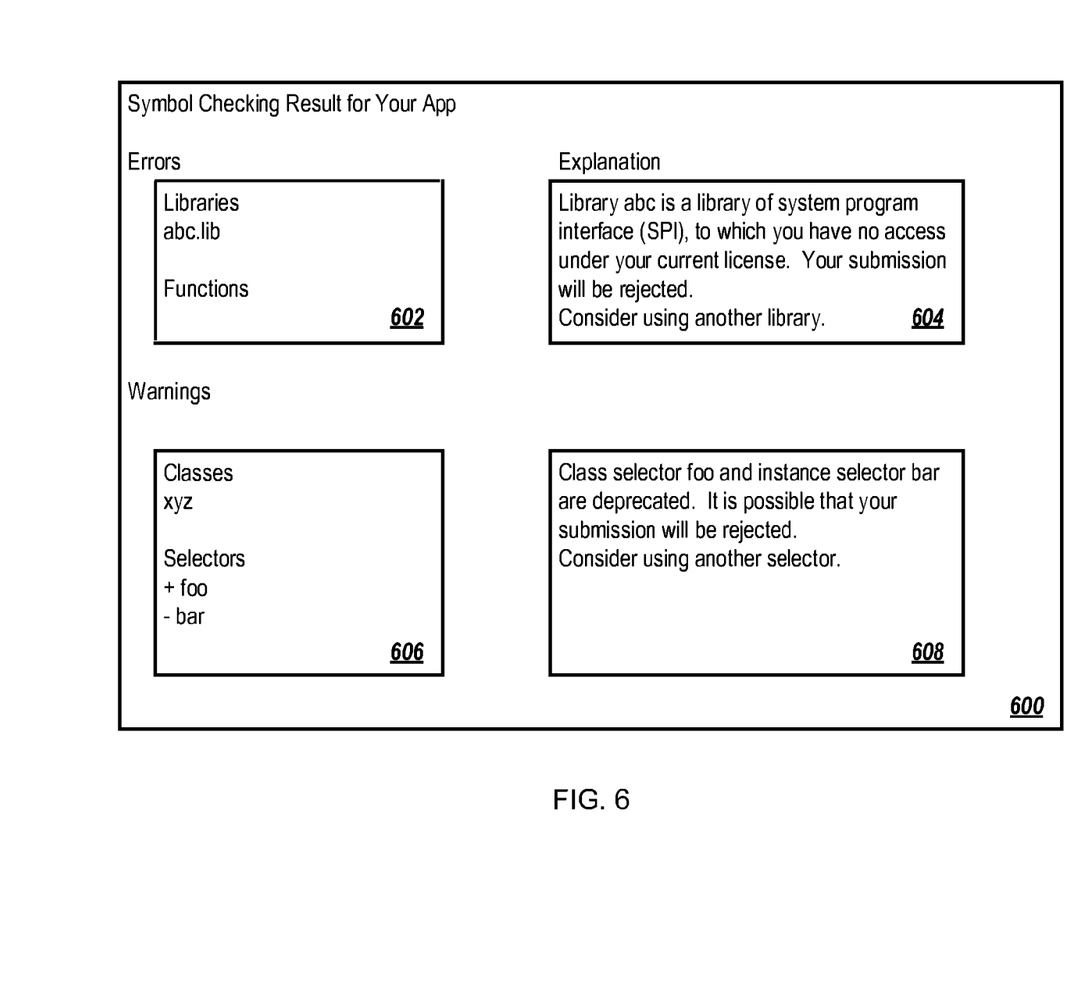
FIG. 6 illustrates an exemplary user interface for notifying a developer of errors and warnings identified for a binary application program.

FIG. 6 illustrates exemplary user interface 600 for notifying a developer errors and warnings identified for a binary application program. Exemplary user interface 600 can be a user interface for displaying formatted notification 514 of FIG. 5, or a user interface for displaying notification 226 as described above with respect to FIG. 2. Example user interface 600 can include at least portion of a web page.

Error section 602 of user interface 600 can include a display area of user interface 600 that displays errors, e.g., symbols scanned from the binary application program that are caused the application program to be rejected or to be withheld from further approval pending user response to a notification. For example, error section 602 can display a name of an unpublished system library (e.g., "abc.lib") that is not accessible by the developer under a current license. Error explanation section 604 can include a display area of user interface 600 that displays explanation of the errors, as well as suggested change (e.g., "Consider using another library"). When multiple errors are present, error section 602 can be configured to accept a user input scrolling the errors and selecting a particular error. Explanation section 604 can display the explanation of the selected error.

Warning section 606 can include a display area of user interface 600 that displays warnings, e.g., symbols scanned from the binary application program that may subject the application program to security risk or cause the application program to fail in the future. In some implementations, warning section 606 can display a name of a class (e.g., "xyz") that is historically subject to abuse. For example, class "xyz" from in the library linked in by the user can include features that are known to be subject to security attack by hackers. Warning section 606 can also display names of libraries, classes, and functions (e.g., class function "foo" and instance function "bar") that will be changed or removed.

Warning explanation section 608 can include a display area of user interface 600 that displays explanation of the warnings, as well as suggested change. When multiple warnings are present, warnings section 606 can be configured to accept a user input scrolling the warnings and selecting a particular warning. Explanation section 604 can display the explanation of the selected warning.

Exemplary Automatic Qualification Process

Figure 7:
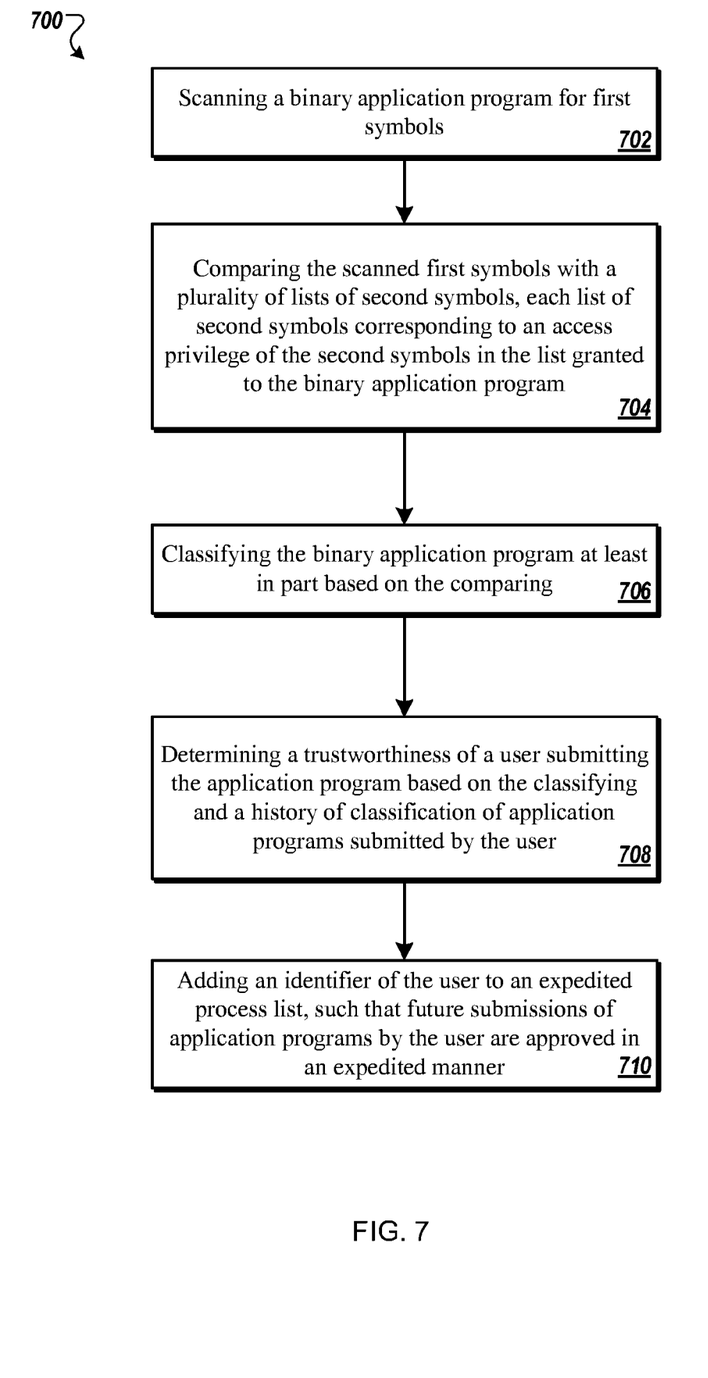
FIG. 7 is a flowchart illustrating an exemplary process of automatically qualifying a binary application program.

FIG. 7 is a flowchart illustrating example process 700 of automatically qualifying a binary application program. For convenience, process 700 will be described in reference to a system that implements process 700.

The system can scan (702) a binary application program for first symbols. The binary application program can be an application program submitted by a developer for approval. The first symbols can include at least one of a library name, a class name, and a function name. The function name can include a mangled function name, a function identifier (e.g., a selector), or both. The function can include a global function, a local function name, or a class method or an instance method, or any executable routine.

The system can compare (704) the scanned first symbols with multiple lists of second symbols. Each of the multiple lists of second symbols can correspond to a specified access privilege of the second symbols in the lists that has been granted to the binary application program. The second symbols can include at least one of a library name, a class name, and a function name. For example, the list of second symbols can include a first list of system symbols, including names of system libraries, classes, or functions. Under a current license of the developer submitting the binary application program, an access from the submitted binary application program to the system libraries, classes, or functions in the first list can be prohibited.

The list of second symbols used in stage 704 can include a second list of published symbols. Under the current license, access from the binary application program to the published symbols is permitted for an indefinite amount of time. The list of second symbols used in stage 704 can include a third list of deprecated symbols. The access to the deprecated symbols can be permitted for a limited amount of time (e.g., until a deprecated library, class, or function is removed).

In stage 704, comparing the scanned first symbols with the multiple lists of second symbols can include calculating a likelihood that the scanned first symbols match one of the lists of the second symbols. Calculating the likelihood can include calculating a match score between each scanned first symbol and each second symbol of a list of second symbols. The match score can measure a probability that a scanned first symbol is equivalent to a second symbol, even when the scanned first symbol literally differs from the second symbol. The system can associate the match score to the scanned first symbol, and calculate the likelihood based on an aggregation of the match scores. In some implementations, calculating the likelihood can include identifying one or more of the scanned first symbols whose associated matching scores exceed a threshold, and calculating the likelihood based on a ratio between the identified one or more of the scanned first symbols and a number of all of the scanned first symbols.

The system can classify (706) the binary application program at least in part based on the comparing. In some implementations, the system can provide trustworthy users preferred status. The system can determine (708) a trustworthiness of a user (e.g., the developer submitting the application program currently being qualified) based on the classification of the currently submitted binary application program and a history of classification of application programs submitted by the developer. For example, if the total number of binary application programs submitted by the developer satisfies a threshold number, and a threshold percentage of the submitted binary application programs (e.g., 100%) are qualified, the developer can be designated as a trustworthy developer.

The system can add (710) an identifier of the user to an expedited process list, such that future submissions of binary application programs by the user are qualified in an expedited manner. Approving a binary application program in the expedited manner can include moving the binary application program to a head of a queue of binary application program waiting to be examined. Approving a binary application program in the expedited manner can include giving more weight to the symbols used in the binary application program when the system determines a frequency of use of the symbols.

In some implementations, process 700 can optionally include creating the lists of second symbols automatically. Creating the lists of second symbols can include determining a popularity score of a first symbol scanned from historically submitted binary application programs, and adding the first symbol to a list of published symbols the access to which is permitted for an indefinite amount of time based on the popularity score.

Figure 8:
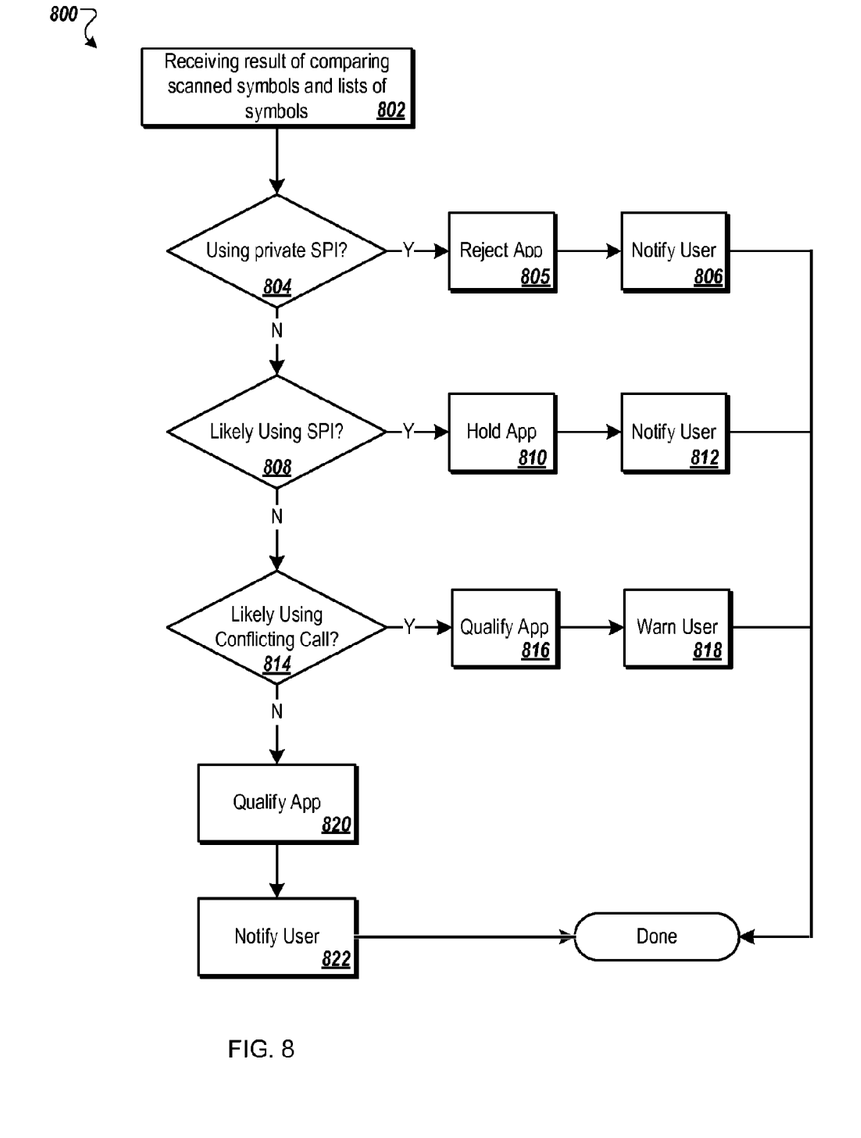
FIG. 8 is a flowchart illustrating an exemplary process of classifying a binary application program.

FIG. 8 is a flowchart illustrating exemplary process 800 of classifying a binary application program. In some implementations, example process 800 can be a process that corresponds to stage 706 of example process 700 of FIG. 7. For convenience, process 800 will be described in reference to a system that implements process 800.

The system can receive (802) results of comparison between first symbols scanned from a binary application program and lists of second symbols. The binary application program can be submitted by a user (e.g., a developer). Classifying the binary application program can include performing an action on the user-submitted binary application program.

The system can make a first determination at stage 804 on whether to take a rejection action. The first determination can include determining whether the scanned first symbols include unpublished symbols. The first determination can include determining whether the scanned first symbols include symbols that indicate that the binary application program uses classes inherited from system classes, or classes private to the system developers. The first determination can include determining whether the scanned first symbols include names of system libraries, or libraries private to the system developers.

Upon determining that the rejection action is to be taken, the system can automatically reject (805) the binary application program. Rejecting the binary application program can include discarding the binary application program. The system can notify (806) the developer reasons for the rejection. The notification can be send as an electronic mail. The electronic mail can include a summary of the reasons for the rejection, or details describing which symbols have caused the rejection.

Upon determining that the rejection action need not be taken, the system can make a second determination at stage 808 on whether to take a hold action. The second determination can include determining that the likelihood that at least one of the first symbols scanned from the binary application program uses a system function or a function private to a system developer satisfies a threshold. The likelihood can be calculated based on the match scores associated with the first symbols. For example, the likelihood can be calculated based an aggregation of the match scores.

Upon determining that the hold action is to be taken, the system can hold (810) the binary application program in an on-hold queue. The system can automatically notify (812) the developer that the system has identified a likely call to an unpublished function. The notification can include an inquiry for explanation with regard to the symbol. Upon receiving a satisfactory response to the inquiry, the system can move the binary application program from the on-hold queue and send the binary application program for further approval or distribution.

Upon determining that the hold action need not be taken, the system can make a third determination at stage 814 on whether to take a warn action. The third determination can include determining whether a class name in the scanned symbols is identical to a name of a system class or a private class, but the scanned symbols excludes a library containing the system class or private class. This can indicate that the binary application program uses a class definition that conflicts with the system class or private class. The third determination can include determining whether any libraries, classes, or functions are dangling. For example, the system can determine that a class or a function is defined by not referenced. The third determination can include determining whether the scanned first symbols include a deprecated library, class, or function.

Upon determining that the warn action is to be taken, the system can qualify (816) the binary application program. The application program can be subject to further approval. The system can warn (818) the developer by sending a warning message to the developer informing the developer of the determination.

In some implementations, at least one of the second determination of stage 808 and the third determination of stage 814 can include determining whether the scanned symbols include symbols identified as part of an API that is subject to abuse. An API that is subject to abuse can include a published API that can be used to hide system or private API usage. Additionally or alternatively, at least one of the second determination of stage 808 and the third determination of stage 814 can include determining whether a number of libraries linked into the binary application program falls below a threshold. If there are too few linked libraries, the system can determine that an unapproved library is used, which can circumvent system or private API usage.

Upon determining that the warn action need not be taken, the system can qualify (820) the submitted binary application program and notify (822) the developer submitting the that the binary application program has been qualified.

Exemplary System Architecture

Figure 9:
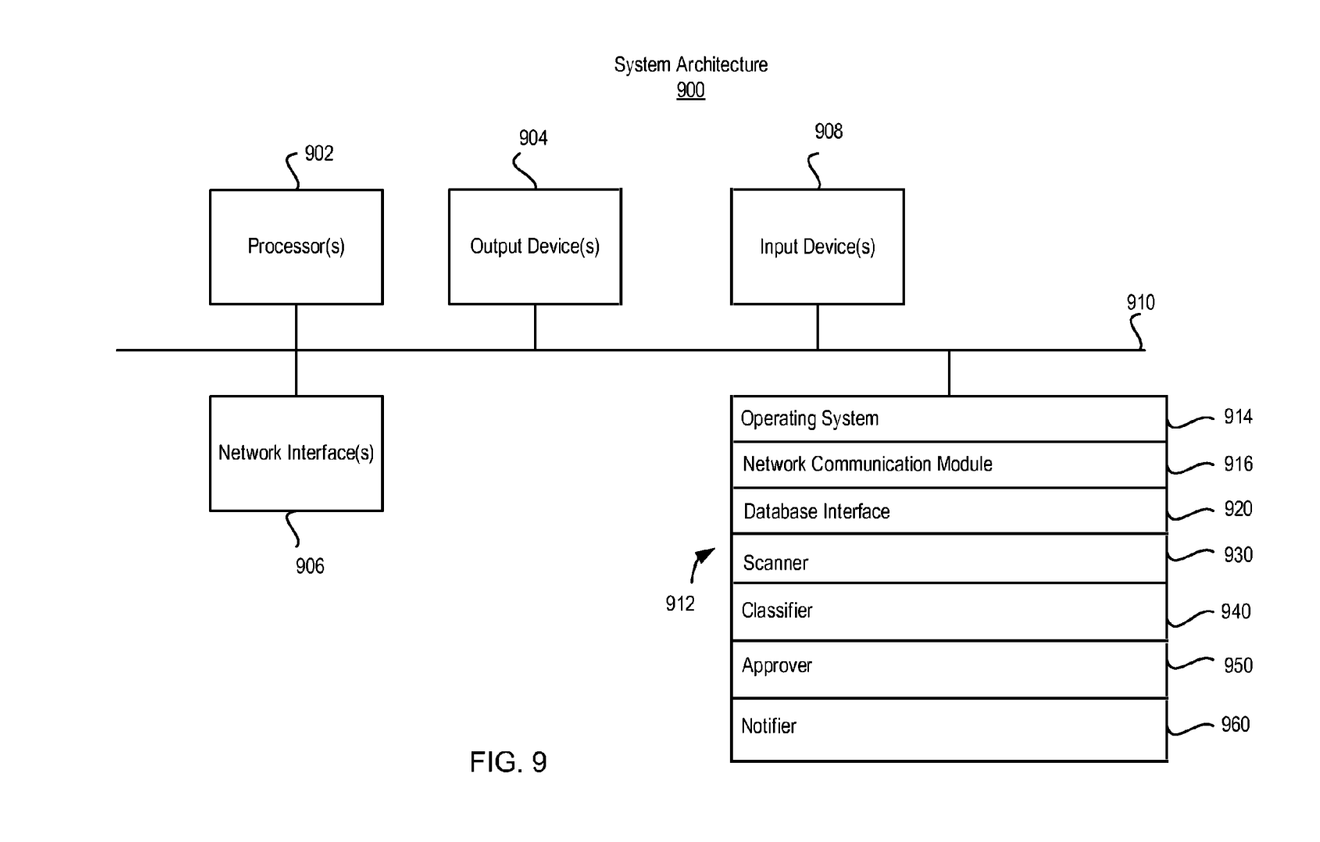
FIG. 9 is a block diagram of an exemplary system architecture for implementing the features and operations described in reference to FIGS. 1-8.

FIG. 9 is a block diagram of an exemplary system architecture 900 for implementing the features and operations described in reference to FIGS. 1-8. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, scanner 930, classifier 940, approver 950, and notifier 960, as described in reference to FIGS. 1-8. Operating system 914 can be multi-user, multiprocessing, multitasking, multithreading, real time, etc. Operating system 914 performs basic tasks, including but not limited to: recognizing input from and providing output to devices 906, 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various data stores such as data stores 212, 404, and 416, as described above in reference to FIG. 2 and FIG. 4. Scanner 930 can include a scanner that corresponds to scanner 206 as described above with respect to FIG. 2. Classifier 940 can include a scanner that corresponds to classifier 210 as described above in reference to FIG. 2 and classifier 304 as described above with respect to FIG. 3. Approver 950 can include an approver that corresponds to approver 220 as described above in reference to FIG. 2. Notifier 960 can include a notifier such as notifier 224 as described above in reference to FIG. 2.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the disclosure. For example, a binary application program is described. In various implementations, binaries other than application programs (e.g., libraries) or application programs other than binaries (e.g., applications written in a script language in plain text) can be automatically qualified. Accordingly, other implementations are within the scope of the following claims.

What is claimed is:

1. A method executed by one or more computers, the method comprising:
    creating a plurality of lists of second symbols automatically,
    the plurality of lists of second symbols including a list of published symbols, and a list of deprecated symbols where access is permitted for a limited amount of time,
        wherein creating the plurality of lists of second symbols includes determining a frequency of use of a first symbol scanned from a plurality of previously submitted binary application programs;
    determining whether the frequency of the use of the first symbol satisfies a usage threshold, wherein if the usage threshold is satisfied:
        moving the first symbol from the list of deprecated symbols to the list of published symbols by removing the first symbol from the list of deprecated symbols and adding the first symbol to the list of published symbols;
    scanning a binary application program for scanned first symbols;
    comparing the scanned first symbols with the plurality of lists of second symbols, each list of second symbols corresponding to an access privilege of the second symbols in the list of second symbols granted to the binary application program; and
    classifying the binary application program at least in part based on the comparing, where comparing the scanned first symbols with the plurality of lists of second symbols includes calculating a likelihood that the scanned first symbols match one of the lists of second symbols.

2. The method of claim 1, where each symbol of the scanned first symbols and second symbols of the plurality of lists of second symbols include at least one of a library name, a class name, and a function name.

3. The method of claim 1, where the plurality of lists of second symbols include:
    a first list of system symbols, where access to the system symbols is prohibited.

4. The method of claim 1, where calculating the likelihood includes:
    calculating a match score, the match score measuring a probability that the scanned first symbol is equivalent to a second symbol of the plurality of lists of second symbols; and
    associating the match score to the scanned first symbol.

5. The method of claim 4, where calculating the likelihood includes:
    identifying one or more of the scanned first symbols whose associated match scores exceed the usage threshold; and
    calculating the likelihood based on a ratio between the identified one or more of the scanned first symbols and a number of all of the scanned first symbols.

6. The method of claim 1, where:
    classifying the binary application program further includes performing one of the following actions:
    automatically rejecting the binary application program and notifying a user who submitted the binary application program a reasons for the rejecting;
    automatically sending an inquiry to the user submitting the application program and approving the application program upon receiving a response from the user;
    automatically sending a notification to the user submitting the application program and approving the user submitted application program, the notification indicating that the application program will expire in the future; and
    approving the application program and notifying the user that the application program is approved.

7. The method of claim 1, further comprising:
    determining a trustworthiness of a user submitting the application program based on the classifying and a history of classification of application programs submitted by the user; and
    qualifying future submissions of binary application programs by the user in an expedited manner based upon the determined trustworthiness.

8. The method of claim 1, where scanning the application program for scanned first symbols includes generating the scanned first symbols in text format based on binary code of the application program.

9. A system, comprising:
    one or more computers configured to perform operations comprising:
    creating a plurality of lists of second symbols automatically,
    the plurality of lists of second symbols including a list of published symbols, and a list of deprecated symbols where access is permitted for a limited amount of time,
        wherein creating the plurality of lists of second symbols includes determining a frequency of use of a first symbol scanned from a plurality of previously submitted binary application programs;
    determining whether the frequency of the use of the first symbol satisfies a usage threshold, wherein if the usage threshold is satisfied:
        moving the first symbol from the list of deprecated symbols to the list of published symbols by removing the first symbol from the list of deprecated symbols and adding the first symbol to the list of published symbols;
    scanning a binary application program for scanned first symbols;

comparing the scanned first symbols with the plurality of lists of second symbols, each list of second symbols corresponding to an access privilege of the second symbols in the list of second symbols granted to the binary application program; and classifying the binary application program at least in part based on the comparing, where comparing the scanned first symbols with the plurality of lists of second symbols includes calculating a likelihood that the scanned first symbols match one of the lists of second symbols.

10. The system of claim 9, where each symbol of the scanned first symbols and second symbols of the plurality of lists of second symbols include at least one of a library name, a class name, and a function name.

11. The system of claim 9, where the plurality of lists of second symbols include at least one of:
 a first list of system symbols, where access to the system symbols is prohibited.

12. The system of claim 9, where calculating the likelihood includes:
 calculating a match score, the match score measuring a probability that the scanned first symbol is equivalent to a second symbol of the plurality of lists of second symbols; and
 associating the match score to the scanned first symbol.

13. The system of claim 12, where calculating the likelihood includes:
 identifying one or more of the scanned first symbols whose associated match scores exceed the usage threshold; and
 calculating the likelihood based on a ratio between the identified one or more of the scanned first symbols and a number of all of the scanned first symbols.

14. A non-transitory computer-readable storage medium storing instructions, the instructions to cause one or more computers to perform operations comprising:
 creating a plurality of lists of second symbols automatically, the plurality of lists of second symbols including a list of published symbols, and a list of deprecated symbols where access is permitted for a limited amount of time, wherein creating the plurality of lists of second symbols includes determining a frequency of use of a first symbol scanned from a plurality of previously submitted binary application programs;
 determining whether the frequency of the use of the first symbol satisfies a usage threshold, wherein if the usage threshold is satisfied:
  moving the first symbol from the list of deprecated symbols to the list of published symbols by removing the first symbol from the list of deprecated symbols and adding the first symbol to the list of published symbols;
 scanning a binary application program for scanned first symbols;
 comparing the scanned first symbols with the plurality of lists of second symbols, each list of second symbols corresponding to an access privilege of the second symbols in the list of second symbols granted to the binary application program; and
 classifying the binary application program at least in part based on the comparing, where comparing the scanned first symbols with the plurality of lists of second symbols includes calculating a likelihood that the scanned first symbols match one of the lists of second symbols.

15. The storage medium of claim 14, where each symbol of the scanned first symbols and second symbols includes at least one of a library name, a class name, and a function name.

16. The storage medium of claim 14, where plurality of lists of second symbols include at least one of:
 a first list of system symbols, where access to the system symbols is prohibited.

* * * * *